(12) United States Patent
Bishop et al.

(10) Patent No.: US 8,090,365 B2
(45) Date of Patent: *Jan. 3, 2012

(54) METHODS, SYSTEMS AND STORAGE MEDIA TO REMOTELY CONTROL A WIRELESS UNIT

(75) Inventors: Michael L. Bishop, Atlanta, GA (US); James Carlton Bedingfield, Sr., Liburn, GA (US); Hong Thi Nguyen, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/774,059

(22) Filed: May 5, 2010

(65) Prior Publication Data

US 2010/0216525 A1  Aug. 26, 2010

Related U.S. Application Data

(63) Continuation of application No. 11/181,321, filed on Jul. 14, 2005, now Pat. No. 7,773,982, which is a continuation-in-part of application No. 10/303,416, filed on Nov. 25, 2002, now Pat. No. 7,389,089.

(51) Int. Cl.
*H04M 3/00* (2006.01)
*G08B 5/22* (2006.01)
*H04B 1/16* (2006.01)
*H04Q 5/22* (2006.01)

(52) U.S. Cl. ........ 455/420; 455/418; 455/419; 455/410; 455/343.2; 455/343.3; 340/7.32; 340/7.33; 340/7.36; 340/10.33; 340/10.34

(58) Field of Classification Search ............ 455/418, 455/419, 420, 574, 343.2, 343.3, 343.4; 340/7.32, 340/7.33, 7.36, 10.33, 10.34
See application file for complete search history.

(56) References Cited

U.S. PATENT DOCUMENTS

| | | |
|---|---|---|
| 5,537,460 A | 7/1996 | Holliday, Jr. et al. |
| 5,541,976 A | 7/1996 | Ghisler |
| 5,608,655 A | 3/1997 | Moughanni et al. |
| 5,752,202 A | 5/1998 | Obright |
| 5,808,551 A | 9/1998 | Yarnall, Jr. et al. |
| 5,881,101 A | 3/1999 | Furman et al. |
| 5,925,942 A | 7/1999 | Theobald |
| 5,940,771 A | 8/1999 | Gollnick et al. |
| 5,963,264 A | 10/1999 | Jackson |
| 5,963,624 A | 10/1999 | Pope |
| 6,100,814 A | 8/2000 | Doyle |
| 6,169,905 B1 | 1/2001 | Fukuda |
| 6,239,690 B1 | 5/2001 | Burbidge et al. |
| 6,295,448 B1 | 9/2001 | Hayes et al. |
| 6,301,484 B1 | 10/2001 | Rogers et al. |
| 6,393,297 B1 | 5/2002 | Song |
| 6,477,361 B1 | 11/2002 | LaGrotta et al. |
| 6,480,476 B1 | 11/2002 | Willars |
| 6,564,074 B2 | 5/2003 | Romans |
| 6,618,580 B2 | 9/2003 | Parrott et al. |
| 6,662,023 B1 | 12/2003 | Helle |
| 6,725,053 B2 | 4/2004 | Rosen et al. |
| 6,760,578 B2 | 7/2004 | Rotzoll |

(Continued)

*Primary Examiner* — Un C Cho
(74) *Attorney, Agent, or Firm* — Cantor Colburn LLP (57) ABSTRACT

A method to remotely control a wireless unit, includes receiving an activation/deactivation request from a user. It is determined if the user is authorized to activate/deactivate the wireless unit. If the user is authorized to activate/deactivate the wireless unit, a signal is sent to the wireless unit causing the wireless unit to power-on/power-off in response to the signal.

20 Claims, 10 Drawing Sheets

U.S. PATENT DOCUMENTS

| | | |
|---|---|---|
| 6,842,613 B2 | 1/2005 | Mittal |
| 6,909,891 B2 | 6/2005 | Yamashita et al. |
| 7,082,129 B2 | 7/2006 | Cromer et al. |
| 7,099,699 B2 | 8/2006 | Jeong |
| 7,103,344 B2 | 9/2006 | Menard |
| 7,773,982 B2 * | 8/2010 | Bishop et al. ................. 455/420 |
| 2002/0030603 A1 | 3/2002 | Amano et al. |
| 2002/0068544 A1 | 6/2002 | Barzilay et al. |
| 2002/0177476 A1 | 11/2002 | Chou |
| 2003/0139175 A1 | 7/2003 | Kim |
| 2003/0198196 A1 | 10/2003 | Bahl et al. |
| 2004/0040317 A1 | 3/2004 | Slifkin et al. |
| 2004/0196142 A1 | 10/2004 | Berg |
| 2004/0242267 A1 | 12/2004 | Walsh |

* cited by examiner

| User ID | Time Restriction | Ignore | Auxiliary Notice | Options |
|---|---|---|---|---|
| 123-456-7890 | NA | N | Email:me@bellsouth.com | Silent mode |
| 110.204.610.3 | Sat.Sun | N | Page:777-777-777 | Silent mode |
| ... | | | | |
| 555-555-5555 | | Y | | |

FIG. 8

METHODS, SYSTEMS AND STORAGE MEDIA TO REMOTELY CONTROL A WIRELESS UNIT

CROSS REFERENCE TO RELATED APPLICATIONS

This application is a continuation of U.S. patent application Ser. No. 11/181,321 filed Jul. 14, 2005, the entire contents of which are incorporated herein by reference, which a continuation-in-part of U.S. patent application Ser. No. 10/303,416, now. U.S. Pat. No. 7,389,089, the entire contents of which are incorporated herein by reference.

FIELD OF THE INVENTION

Exemplary embodiments relate to communications, and particularly relate to wireless units that are used in communications. Even more particularly, embodiments relate to remote control of the wireless units such as remote powering-on of a wireless unit that is turned-off or remote powering-off of a wireless unit that is powered-on.

BACKGROUND

Communication devices are ubiquitous in our society. Besides a telephone at home and at work, many people also have other devices such as a mobile phone, a personal digital assistant (PDA), a pager, an interactive pager (i-pager), a laptop computer, or the like. Unlike a landline telephone, these other communication devices may travel with the user. In addition, these other devices may be turned-on and turned-off.

A user with a mobile device may turn-off the device for many reasons. The user may desire to conserve the battery of the device. Sometimes circumstances dictate that the mobile device be turned-off. Many people turn-off their mobile phones when they are driving to avoid the temptation of answering calls, and thus, using the mobile phones while driving. Other people turn-off their mobile devices while attending meetings, or while participating in public events or gatherings where use of the mobile devices would be perceived as impolite or inconsiderate with respect to others. Sometimes, a person may turn-off his or her mobile device simply to avoid being disturbed. In other cases, a person may inadvertently turn-off his or her device and may not realize it.

Once a person turns-off his or her mobile device, the person cuts himself or herself off from people who may desire to communicate with him or her through the mobile device. For example, when I turn off my mobile phone, people who try to reach me using my mobile number are unable to do so. At times, the inability to reach a person who has turned off his or her mobile device may simply be inconvenient. At other times, the unavailability of the person through the mobile device may be disadvantageous, unfortunate, or even devastating to either the user, the caller, or both.

It may be devastating to the caller to be unable to reach a person on his or her turned-off mobile device because the caller may be having an emergency. The caller may have suffered a car accident, incurred some injury, or be threatened in some way. In other words, the caller may be in need of help and unable to reach the person with the turned-off mobile device for such help.

The inability to contact the person who turned off his or her mobile device may be disadvantageous or even disastrous for that person, too. For example, a family member who is keeping up with weather conditions in the person's area may have information regarding the need to evacuate the area immediately such as in the case of a tornado or hurricane. But the family member may be frustrated in his or her attempts to convey information on the emergency situation to the person because his or her mobile device is turned-off. The family member may suffer anguish in not knowing whether the person is safe or even aware of the weather emergency. If the person remains unaware of the weather conditions, the person may be in a life threatening situation.

Thus, there is a need for methods to reach a person whose mobile device is turned-off. In particular, there is a need for methods to remotely power-on the mobile device so that a communication may be put through to the mobile device.

Similarly, there are circumstances where it would be convenient or important to be able to turn-off a remote mobile device that has been powered-on. For example, a person may have left his or her mobile device at home while traveling. There is little point for the mobile device to be powered-on when the user is remote from the device. It would be convenient for the person to be able to remotely turn-off the powered-on mobile device. As another example, a person may have a powered-on mobile device and be in a situation where a call to the device would be embarrassing, disturbing, or even dangerous. If another party knew of the situation, it would be desirable for the other party to be able to turn-off the powered-on device in the person's possession.

In sum, there is a need for remote control over mobile devices. In particular, there is a need for methods to remotely power-on a mobile device so that a communication may be put through to the mobile device. There is also a need for methods to remotely turn-off a mobile device that is powered-on. There is also a need to determine if a user is authorized to power-on or power-off a mobile device.

SUMMARY

Exemplary embodiments include a method to remotely control a wireless unit, comprising: receiving an activation/deactivation request from a user; determining if the user is authorized to activate/deactivate the wireless unit; if the user is authorized to activate/deactivate the wireless unit, sending a signal to the wireless unit causing the wireless unit to power-on/power-off in response to the signal.

Exemplary embodiments include a computer program product for controlling a wireless unit, the computer program product comprising: a storage medium readable by a processing circuit and storing instructions for execution by the processing circuit for facilitating a method comprising: causing the wireless unit to have a power-on state and a sleep state; causing the wireless unit to go into the sleep state when the wireless unit is turned-off; causing the wireless unit in the sleep state to have an active transmit and receive function and an active location function; causing the wireless unit in the sleep state to change to the power-on state in response to receipt of an authorized remote power-on signal.

Exemplary embodiments include a computer program product for remotely controlling a wireless unit, the computer program product comprising: a storage medium readable by a processing circuit and storing instructions for execution by the processing circuit for facilitating a method comprising: receiving an activation/deactivation request from a user; determining if the user is authorized to activate/deactivate the wireless unit; if the user is authorized to activate/deactivate the wireless unit, sending a signal to the wireless unit causing the wireless unit to power-on/power-off in response to the signal.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
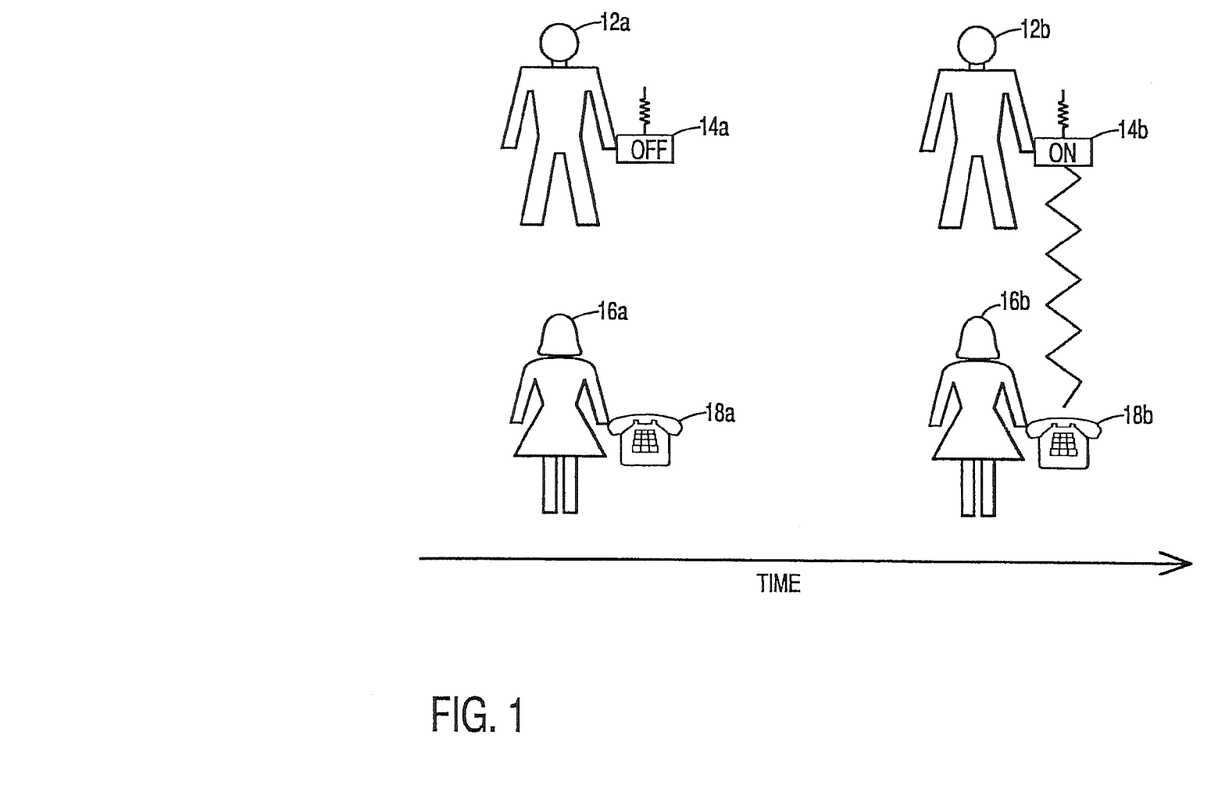
FIG. 1 illustrates an environment for use of exemplary embodiments.

Exemplary embodiments allow for remote control of a wireless unit. In particular, exemplary embodiments may be used to remotely power-on a wireless unit that has been turned-off. For example, referring to FIG. 1, a user 12a of a wireless unit 14a has turned-off his wireless unit 14a. A caller 16a, desires to contact the user 12a on his wireless unit 14a, but is frustrated because the user's wireless unit 14a is turned off. Advantageously, the embodiments allow the caller 16b to remotely power-on the turned-off wireless unit 14b. The caller 16b may use a telephone 18b to place a call to a preauthorized number. As a result of the call, the wireless unit 14b is turned-on. In addition, the caller 16b may be connected by the call on the telephone 18b to the user 12b of the wireless unit 14b. Thus, the caller 16b has achieved making contact with the user 12b through the user's wireless unit 14b.

As used herein, the terms "powered-on", "turned-on" and "activate" (or variations thereof) are synonymous. Also, the terms "powered-off", "turned-off" and "deactivate" (or variations thereof) are synonymous.

The party, who takes action to remotely turn-on or turn-off the wireless unit, may be a person and may be referred to herein as the authorized user. The user is qualified herein as "authorized" because it is assumed that only selected parties would have sufficient information to power-on or power-off a wireless unit of another party. For example, a party attempting to power-on or turn-off a wireless unit may be required to provide a password. The authorization of activation/deactivation of the wireless unit is described in further detail herein. Further, the authorized user does not have to be a person. The authorized user may be a computer, or other device with the functionality to take actions to remotely turn-on or turn-off the wireless unit. The party associated with the wireless unit to be remotely turned-on may be a person, and may be referred to herein as the user.

In the examples, a mobile phone is used as the wireless unit that is remotely turned-on or turned-off. But a wireless unit is not limited to being a mobile phone, and may be any device with appropriate functionality. For example, a wireless unit may be a computer, a personal digital assistant (PDA), a pager, an i-pager, or other similar device.

Also in embodiments, a telephone is used as the communications device to remotely turn-off or turn-on the wireless unit. But a communications device may be any other device with the functionality to work with exemplary embodiments. For example, a communications device may be a computer, a personal digital assistant, a pager, an i-pager, a mobile phone, or other similar device.

An activation system is referenced with respect to some of the exemplary embodiments. The activation system may be a computer running a program or application, or be a program or application. In either case, the activation system may have access to a database, a computer, a server, a platform, or other program or device to facilitate recognition of communication information received from a communications element. In response to the recognition, the activation system takes action or has access to an element(s) that cause a signal to be sent to a wireless unit. The activation system is illustrated as a separate unit connected between the requestor and a wireless system. But the activation system need not be so limited. The activation system may be a part of or included in another device in the wireless system, or an appropriately connected data communications network.

Figure 2:
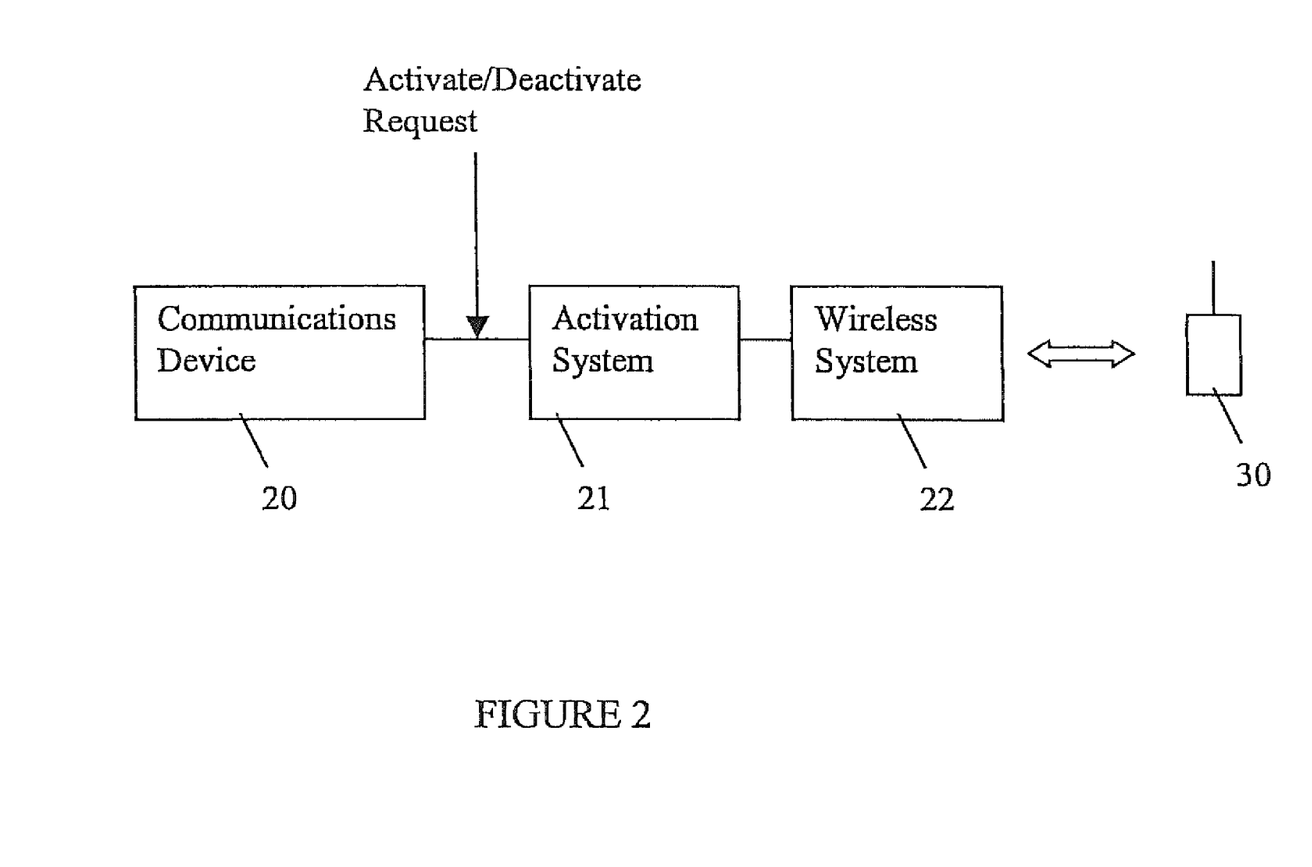
FIG. 2 illustrates a system in exemplary embodiments.

FIG. 2 illustrates an environment for exemplary embodiments. In exemplary embodiments, a party may remotely turn-on/turn-off a wireless unit 30 of another party. Specifically, an authorized user may use a communications device 20 to generate an activation/deactivation request to begin a process to remotely turn-on/turn-off a user's wireless unit 30. The activation/deactivation request is processed by activation system 21 which then sends instructions to a wireless system 22 as described in detail herein.

Figure 2A:
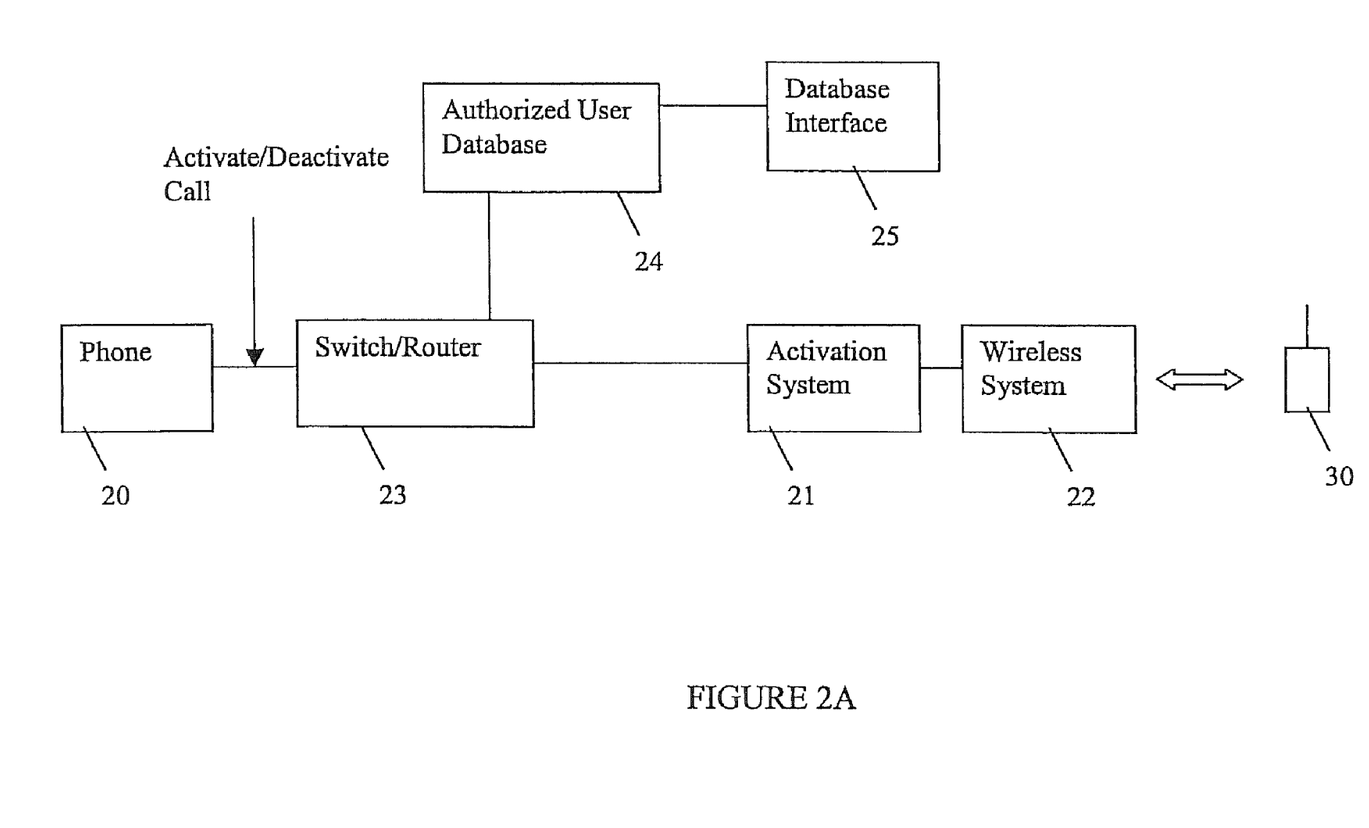
FIG. 2A illustrates another system in exemplary embodiments.

FIG. 2A illustrates a system in exemplary embodiments in which the activation/deactivation request is generated by a telephone call. In the case of a telephone as the communications device 20, the user may place a call to a special number such as an access number or a star code. A network element 23, such as a switch or router, receives the activation/deactivation call and determines whether the caller is authorized to activate/deactivate wireless device 30. The network element 23 accesses an authorized user database 24. The authorized user database 24 includes records identifying which users have access to remotely activate/deactivate the wireless unit 30. Network element 23 accesses authorized user database 24 to determine if the caller is authorized. This may be determined based on a number of identifiers such as caller identification associated with the phone 20. The authorization of users is described in further detail herein. A database interface 25 allows the user of the wireless unit 30 to manage certain features of the authorization database. The database interface 25 is described in further detail herein.

If the network element 23 determines that the caller is not authorized to activate/deactivate the wireless unit 30, then a message is played to the user stating that they are not authorized. A self-authorization process may be initiated as described in further detail herein. If the user is authorized to activate/deactivate the wireless unit, the network element 23 contacts activation system 21 and provides the activation system 21 with the communication information associated with the call.

In alternate embodiments, to remotely power-on a wireless unit, the authorized user may place a call to a directory number that results in the call being routed directly to the device including the remote control functionality such as the activation system 21.

In exemplary embodiments, in response to the communication information received from network element 23, the activation system 21 provides instructions or takes other action, through the wireless system 22 so that a signal reaches the wireless unit 30 that causes the wireless unit 30 to power-on. For example, the activation system 21 may provide information to the wireless system 22 including the telephone number of the wireless unit 30, the desired command (such as "power-on"), and an authorization code all received from the network element 23. This information received from the activation system 21 may cause the wireless system 22 to send a signal to the wireless unit 30 that the wireless unit 30 interprets as an indication to power-on.

In the exemplary embodiments described above, the activation system 21 sends information to the wireless system 22 so that a signal reaches the wireless unit 30 that causes the wireless unit 30 to power-on. But in another embodiments, the activation system 21 does not send information to the wireless system 22. Rather, the activation system 21 responds with information to the network element 23. Alternatively, the network element 23 may contain the necessary activation information. The network element 23 may use the information to initiate contact with the wireless system 22. The contact may cause a signal to be sent to the wireless unit 30 that causes the wireless unit 30 to turn-on. As an example, network element 23 may route the call from communications device 20 to the wireless system 22. As another example, network element 23 may provide communication information and instruct a peripheral device (such as a service node) to call the wireless system 22. In response to receipt of the call, the wireless system 22 may send a signal to the wireless unit 30 that causes the wireless unit 30 to turn-on or turn-off.

An advantage of these exemplary embodiments is that an authorized user does not have to take separate action to determine that the power-on/power-off efforts were successful. These embodiments provide confirmation of the powered-on state of the wireless unit 30. For example, once the activation system 21 sends information to cause power-on of the wireless unit 30, the activation system 21 may take action to verify that the wireless unit 30 is powered-on. The activation system 21 may call the wireless unit 30, or may cause a call to be placed to the wireless unit 30. Similarly, the activation system 21 may send a message to the wireless unit, or may cause a message to be sent to the wireless unit 30.

In response to the call or to the message, the activation system 21 may receive a response from the wireless unit 30 or from the wireless system 22. If the activation system 21 receives a response confirming that the wireless unit 30 is powered-on ("confirmation response"), then the activation system 21 may provide a confirmation to the authorized user who initiated the power-on communication. The activation system 21 may contact the authorized user with the confirmation, or the activation system may cause the confirmation to be provided to the authorized user through a PSTN, or other network.

Further, the activation system 21 may connect the authorized user in a communication with the wireless unit 30. For example, the activation system 21 may provide instructions to route the authorized user's power-on communication so as to connect the power-on communication to the wireless unit 30.

It will be appreciated that the actions described above in connection with the powering-on of a wireless unit may also be used (with appropriate changes) to turn-off the wireless unit. An appropriate change may include a change in the access number or star code used by the authorized user to commence the actions. Alternatively, the authorized user may be asked to indicate whether the communication is to effect power-on or turn-on, and such indication may be associated with the communication information and signals to the wireless unit 30.

A request to power off the wireless unit 30 may be postponed if the wireless unit 30 is actively engaged in a call or other transaction. For a data transaction, the wireless unit 30 and/or wireless system 22 may include a timer that elapses after the user has not performed any input actions for a set time. If the timer has not elapsed, this indicates that the user is involved in a data transaction and the power-off request is postponed until the timer elapses. For a voice call or other circuit-switched communication, the wireless unit 30 and/or wireless system 22 detects whether there is an active call in progress. If an active call is in progress, the power-off request is postponed until the active call is terminated.

Figure 2B:
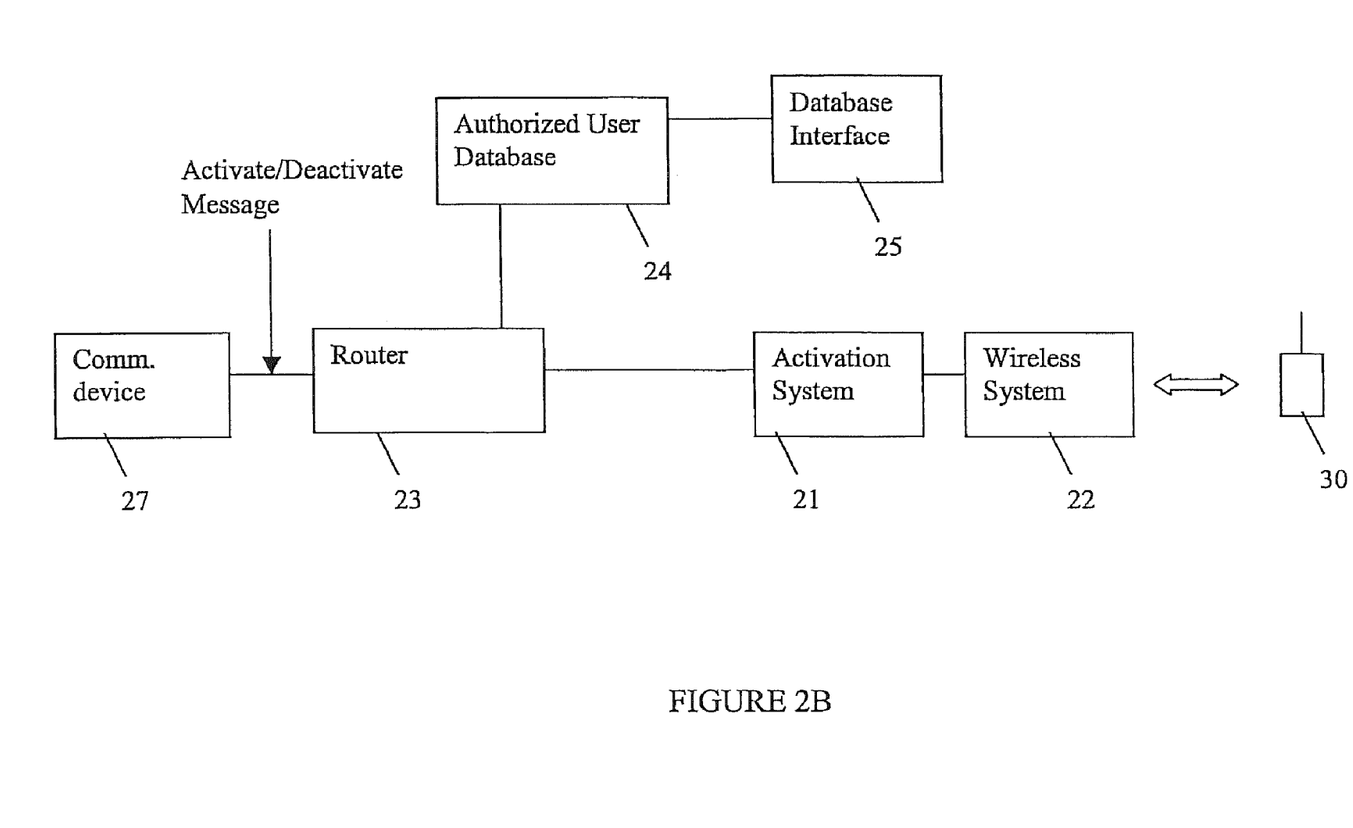
FIG. 2B illustrates another system in exemplary embodiments.

FIG. 2B illustrates a system in alternate embodiments. In the system of FIG. 2B, the activation/deactivation message is derived from a messaging device 27, which may be a web interface, VoIP, PDA, or other packet-based or other type of messaging device. This activation/deactivation message is received by router 23 which determines from the authorized user database 24 whether the user at messaging device 27 is authorized to control the wireless unit 30. If so, the wireless unit is controlled as described above with reference to FIG. 2A. Thus, the user initiating the activation/deactivation message may use a variety of communications devices, such as phones (landline and wireless), web enabled devices, packet-based communication devices, etc.

As noted above, in response to the receipt of a signal, the wireless unit 30 changes state from turned-off to powered-on. In exemplary embodiments, the wireless unit 30 includes a remote power-on function (also referred to herein as remote power-on circuit) 48 shown in FIG. 3. Even though the wireless unit 30 is turned-off, the wireless unit 30 may receive a power-on signal. The wireless unit 30 may receive a power-on signal because, even though the wireless unit 30 is turned-off, certain functions of the wireless unit 30 may remain active. In an exemplary embodiment of the wireless unit 30, the transmit and receive function (also referred to as the radio transmitter/receiver), the location function (also referred to as the cell system location circuits), and the remote power-on function of the wireless unit 30 may remain active. With these functions remaining active, the wireless system 32 may be able to keep track of the location of the wireless unit 30 and may be able to send the wireless unit a signal, which causes the wireless unit 30 to power-on.

Figure 3:
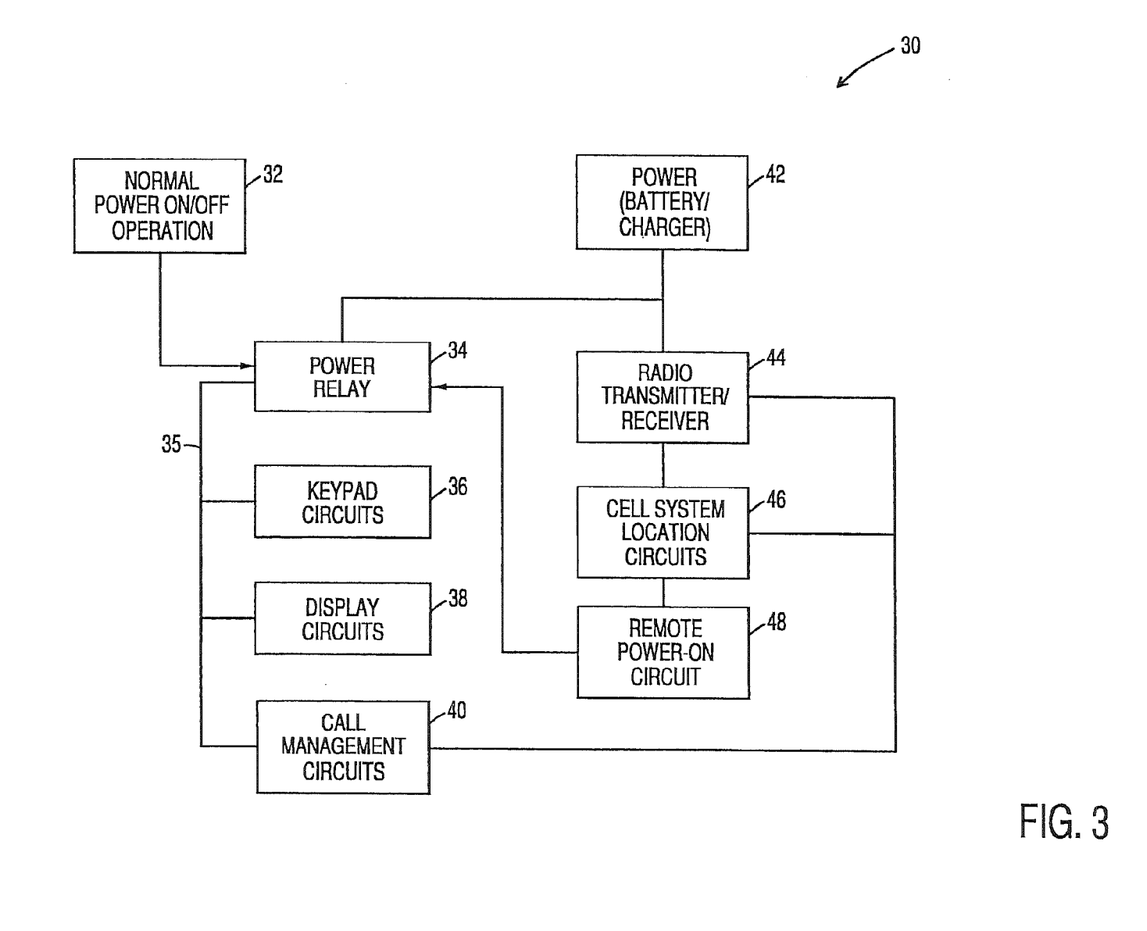
FIG. 3 is a block diagram illustrating certain functions of an exemplary wireless unit as may be used with exemplary embodiments.

FIG. 3 is a block diagram illustrating certain functions of an exemplary wireless unit 30 as may be used with exemplary embodiments. The functions may include a power on/off operation (also referred to as "normal", "conventional", or "standard" on/off function that may be activated by an on/off button). The functions of the wireless unit 30 also may include the on/off operations 32 connected to a power relay 34. The power relay 34 connects to a bus 35 that connects keypad circuits 36, display circuits 38, and call management circuits 40. Further, the functions of the wireless unit 30 may include power 42 (also referred to as the battery or battery/charger) connected to the power relay 34 and to the radio transmitter/receiver 44 (also referred to as the transmit and receive function). The radio transmitter/receiver 44 is connected to the cell system location circuits 46 (also referred to as the location function) and to the call management circuits 40. The cell system location circuits 46 are connected to the remote power-on circuit 48 (also referred to as the remote power-on function) and to the call management circuits 40. The remote power-on circuit 48 is connected to the power relay 34.

In exemplary embodiments, the wireless unit 30 is initially in a turned-off state. When the wireless unit 30 is turned-off, certain functions remains active. These functions include the transmit and receive function 44, the location function 46, and the remote power-on function 48. These functions remain active because these functions are connected to the power 42 of the wireless unit 30. The transmit and receive function 44, the location function 46, and the remote power-on function 48 are not affected by the on/off function 32 of the wireless unit. In other words, when the wireless unit 30 is turned-off, the transmit and receive function 44, the location function 46, and the remote power-on function 48 remain active.

In particular, the turned-off wireless unit 30 may receive a signal from the wireless system 32 through its active transmit and receive function 44. The active location function 46 of the turned-off wireless unit 30 has kept the wireless system 32 apprised of the location of the wireless unit 30. Once the signal is received, the remote power-on function 48 "powers-on" the wireless unit 30 by a turn-on signal sent to the power relay 34. Thus, the remote power-on function 48 may function like an on/off switch or button. Advantageously, when the wireless unit 30 is powered-on, the remote power-on circuit 48 may be deactivated.

It will be appreciated that the configuration and functions of the wireless unit 30 described above in connection with the powering-on of a unit may also be used (with appropriate changes) to turn-off the wireless unit. Once the wireless unit 30 receives a signal that indicates the unit is to be turned-off, the remote power-on function 48 of the wireless unit 30 sends a "turn-off" signal to the power relay 34. Even though the wireless unit 30 is turned-off, the transmit and receive function 44, the location function 46, and the remote power-on function 48 may remain active.

Figure 4:
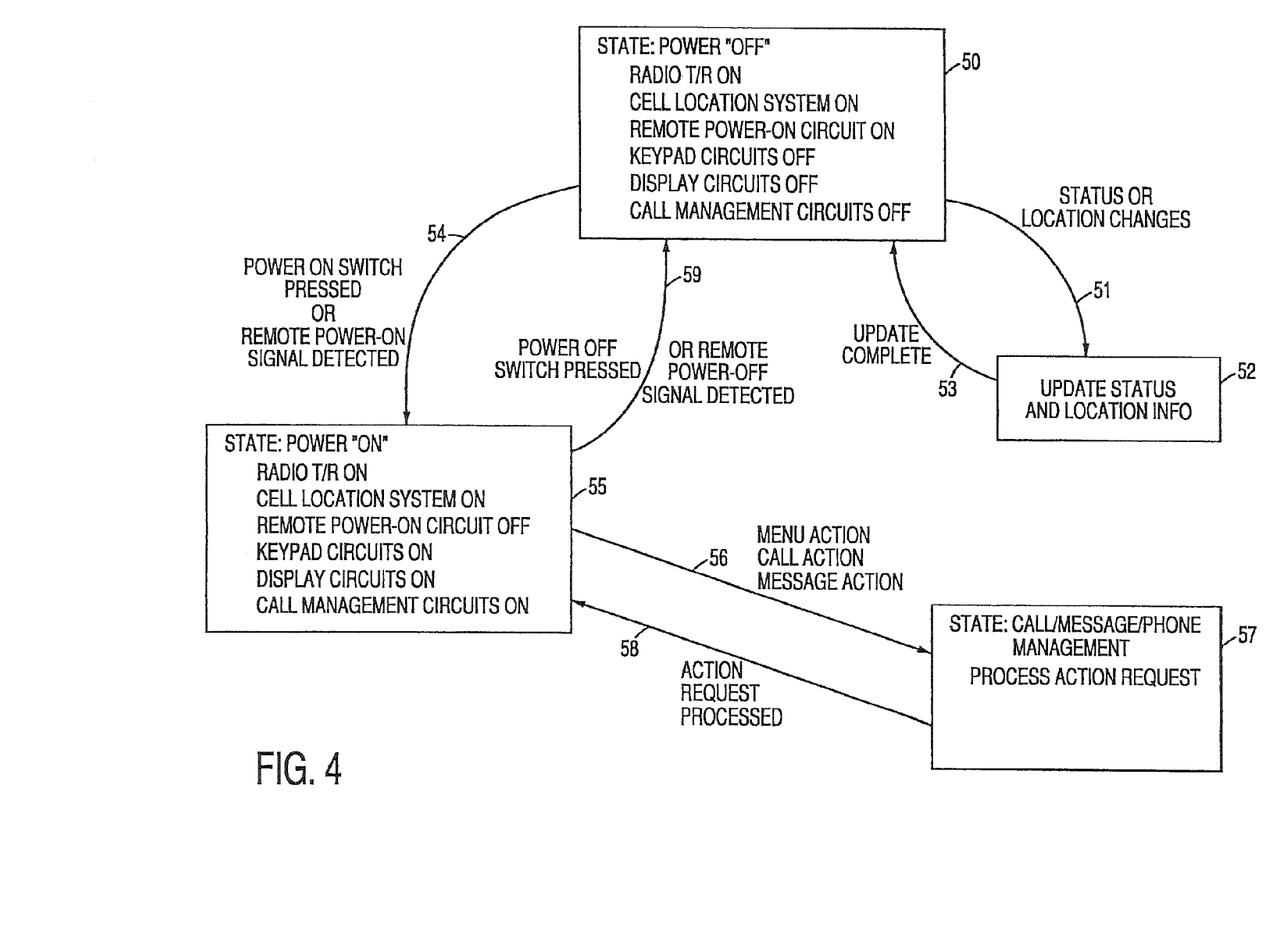
FIG. 4 is a state diagram illustrating exemplary states of a wireless unit as may be used with exemplary embodiments.

FIG. 4 is a state diagram illustrating exemplary states of a wireless unit as may be used with exemplary embodiments. For example, assume the state of a wireless unit is "off" as referenced in block 50 by power "off". This "off" state also may be referred to as the "sleep" state of exemplary embodiments. In exemplary embodiments, if the state of the wireless unit is off, then the radio TR (also referred to as the radio transmitter/receiver or the transmit and receive function 44) is turned-on. Also turned-on are the cell location system (also referred to as the location function 46) and the remote power-on circuit (also referred to as the remote power-on function 48). Still referring to block 50 with the wireless unit in the "off" or "sleep" state, the functions related to keypad circuits, display circuits, and call management circuits are turned-off.

While the wireless unit is in the off or sleep state, events may transpire with respect to the status or location of the wireless unit. As illustrated by arrow 51 in FIG. 4, if the status and/or the location of the wireless unit changes, then the state of the wireless unit changes from off or sleep to an update status as indicated by block 52. In the update status, the wireless unit is updated with status and/or location information. The wireless unit is able to function in this update status because certain of its functions (as explained above in connection with FIG. 3) remain active even though the unit is turned-off or sleeping. Once the update is complete, then as indicated by arrow 53 in FIG. 4, the state of the wireless unit returns to the "off" or "sleep" state.

While the wireless unit is in the off or sleep state, the wireless unit does not accept communications attempting to reach the user of the wireless unit. However, while the wireless unit is in the off or sleep state, a signal or other information may be received by the wireless unit to "power-on". For example, a wireless unit in the off or sleep state may receive a signal indicating that the power on/off switch has been pressed. The pressing of the power on/off switch is a conventional manner of turning on the wireless unit. Alternatively, the wireless unit in the off or sleep state may receive a signal or otherwise understand that the wireless unit is to power-on. For example, a remote power-on signal may be received and detected.

If a power-on signal (whether remote or conventional) is received by the wireless unit in the off or sleep state, then as indicated by arrow 54, the state of the wireless unit may change from off or sleep to "on" as referenced in block 55 by power "on". In the on state, the radio T/R and the cell location system of the wireless unit are turned-on. In addition, the keypad circuits, the display circuits, and the call management circuits are turned-on. But the remote power-on circuit may be turned off. In an alternate embodiment, the remote power-on circuit also may remain active when the wireless unit is in the on state.

While the wireless unit is powered-on, certain actions as indicated by arrow 56 may take place to change the state of the wireless unit to a call/message/phone management state as illustrated by block 57. For example, a menu action, a call action, or a message action may take place with respect to the wireless unit. Once the action is received, it is processed by the wireless unit, and as indicated by arrow 58, the wireless unit returns to the power on state as indicated by block 55.

While in the power on state as indicated by block 55, the wireless unit may receive a power-off signal. If a power-off signal (whether remote or conventional) is received by the wireless unit in the on state, then as indicated by arrow 59, the state of the wireless unit may change from on to off as referenced in block 50 by power "off". As noted above in connection with the power off state, the radio T/R and the cell location system of the wireless unit remain active while the other functions of the wireless unit may be turned off.

Embodiments provide for yet another alternative exemplary embodiment to provide for the remote power-up or turn-off of a wireless unit. In this embodiment, the wireless unit may include a remote power-on function. If the remote power-on function detects receipt of a signal, then the remote power-on function may power-on the wireless unit (or turn-off the unit depending on the circumstances).

Figure 5:
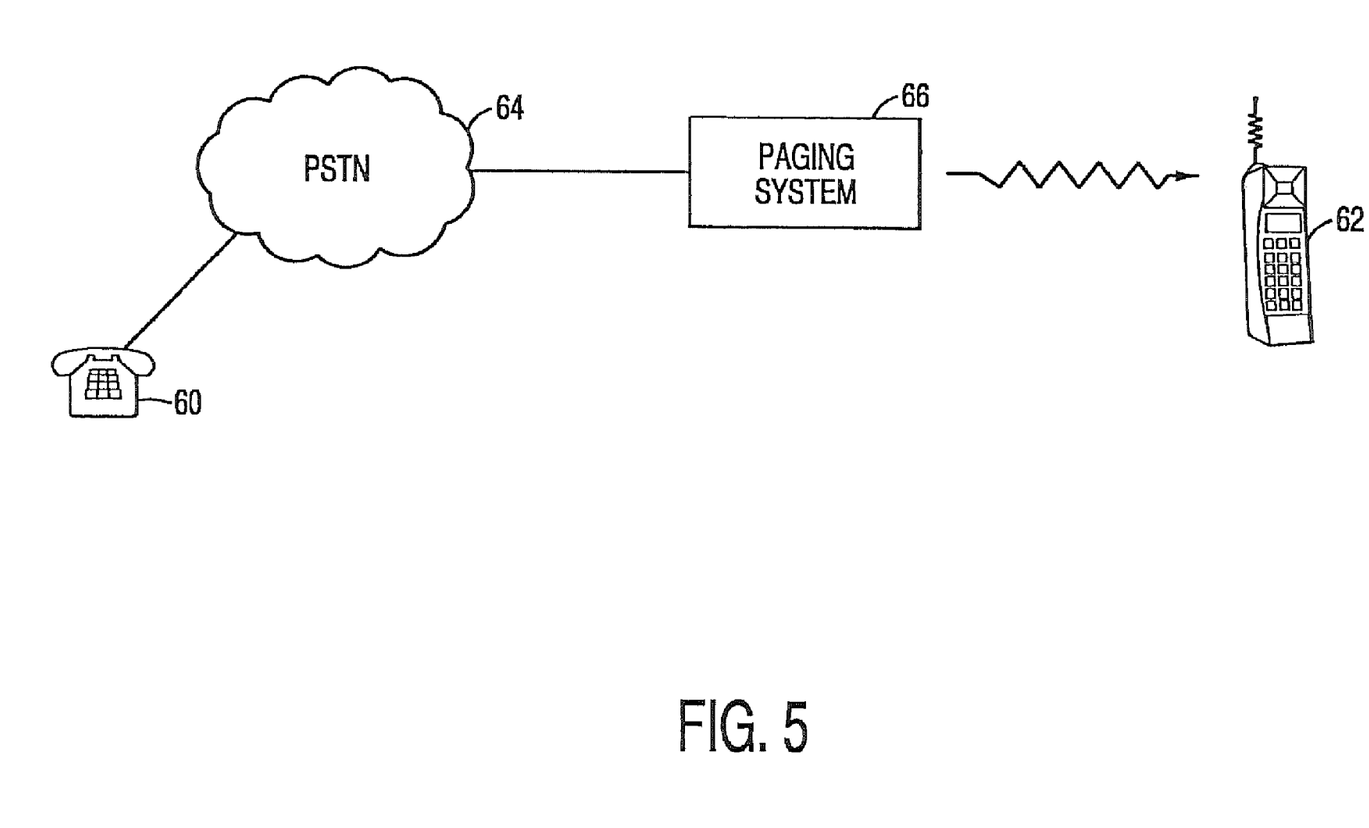
FIG. 5 illustrates yet another environment for use of exemplary embodiments.

An example of this alternative embodiment is illustrated in FIG. 5. An authorized user 60 may initiate a communication or send a signal to power-on or turn-off a wireless unit 62. In an exemplary embodiment, the signal may be a page. Thus, the authorized user 60 may use a telephone (or any other appropriate device) to send a page that is received by the PSTN 64, and that is conveyed to a paging system 66. The page is received ultimately by the wireless unit 62. In response to the page, the wireless unit 62 my change its state from turned-off to powered-on, or vice-versa.

Figure 6:
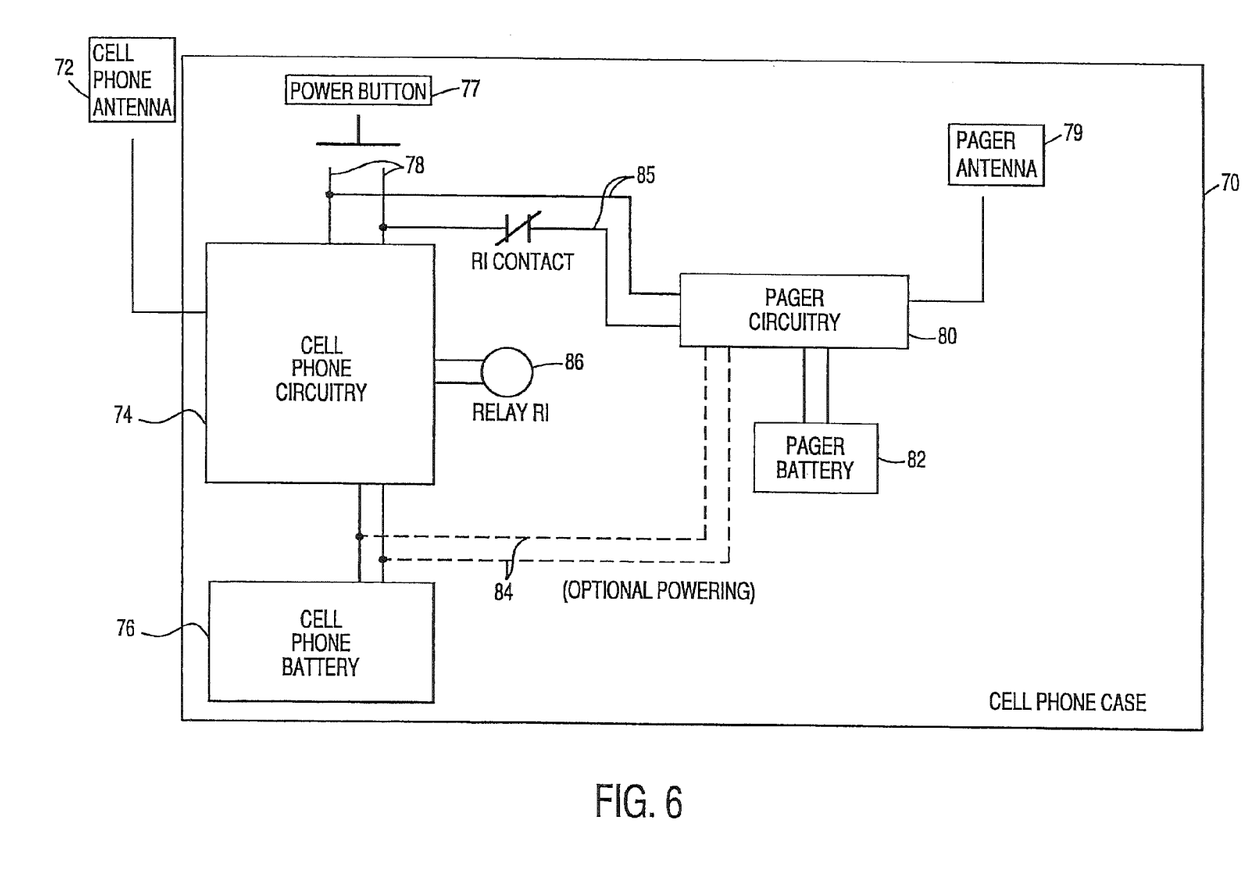
FIG. 6 is a schematic illustrating an exemplary configuration of a wireless unit as may be used with exemplary embodiments.

FIG. 6 illustrates an exemplary wireless unit 70 configured per exemplary embodiments. The wireless unit 70 includes an antenna 72 (also referred to as cell phone antenna) deployed on the exterior of the wireless unit 70. The antenna 72 is connected to circuitry 74 (also referred to as cell phone circuitry), which is connected to a battery 76 (also referred to as cell phone battery). The wireless unit 70 also includes a power button 77 connected by leads 78 to the cell phone circuitry 74. The power button 77 is the conventional on/off button for the wireless unit 70.

The exemplary wireless unit 70 further includes functionality to mimic the power-on/off function of the wireless unit 70 in response to receipt of certain signals. In other words, if the exemplary wireless unit 70 receives certain information, then the wireless unit 70 powers-on or powers-off just as if the conventional on/off button 77 of the wireless unit 70 had been pressed.

In this exemplary embodiment, the power-on/off of the wireless unit 70 is accomplished through a remote power-on function that appears to activate the "conventional" on/off button of the wireless unit 70. The remote power-on function mimics the activation of the on/off button 77. The remote activation is accomplished through the use of certain functions of a digital pager as connected to elements of the wireless unit 70. In particular, the remote power-on function includes a pager antenna 79 connected to pager circuitry 80.

Power to the pager circuitry 80 is provided by a pager battery 82 so that the remote power-on function may operate even when the wireless unit is turned-off. Optionally, the pager circuitry 80 may be connected (as illustrated by dotted lines 84) to the cell phone battery 76 for power. Further, the pager circuitry 80 is connected via connection 85 to the leads 78 that connect the power button 77 to the cell phone circuitry 74. While the wireless unit 70 is turned off, the connection 85 between the pager circuitry 80 and the leads 78 is open (or non-functional). In other words, the connection 85 between the remote power-on/off function does not interfere with the conventional on/off operation of the wireless unit.

In an embodiment, the remote power-on/off function may include a prevention function such as a relay (Relay R1 and also referred to as R1 contact) 86 or other device connected to the cell phone circuitry 74 to prevent the remote powering off of the wireless unit 70 when it is powered-on. In particular, with the R1 contact open, even if another page is received, the open R1 contact prevents the page from affecting the wireless unit 70. In the case where the remote power-off function is desired, the R1 contact is unnecessary.

In this exemplary embodiment, the pager antenna 79 may pass information to the pager circuitry 80 upon receipt of a page as or including a remote power on/off signal. The pager antenna 79 and the pager circuitry 80 may be referred to herein as an exemplary example of a page detector in the wireless unit 70. The page or the remote power on/off signal may include information functioning as a security mechanism to prevent frivolous power-on/off. The security mechanism may be a numeric or other code embedded in the information received as part of the signal from the paging system. Failure of the page or the remote power-on/off signal to include the security mechanism may lead to a failure in turning-on/off of the wireless unit. In response to the detection of the remote power-on/off signal, the pager circuitry takes action to close (or make functional) the connection 85 between the pager circuitry 80 and the leads that connect the power button 77 to the cell phone circuitry 74. As a result of the closing of this connection 85, the activation of the power button 77 is mimicked. In other words, the cell phone circuitry 74 detects information that the wireless unit 70 is to be powered-on (or off), and takes the appropriate action.

The exemplary embodiment described in connection with FIGS. 5 and 6 referred to the use of pager elements and the paging system to remotely power-on/off a wireless unit. The pager elements are described as being included in the wireless unit 70. In an alternate embodiment, the remote power-on/off function may be provided by a unit including the described pager elements where the unit is connectively attached (inside or outside) to the wireless unit 70. Further, instead of a pager, other elements and systems may be used. Such elements and systems may include other data elements and systems such as used with a WiFi network, Bluetooth, or other licensed or unlicensed spectrum suitable for the purpose.

Figure 7:
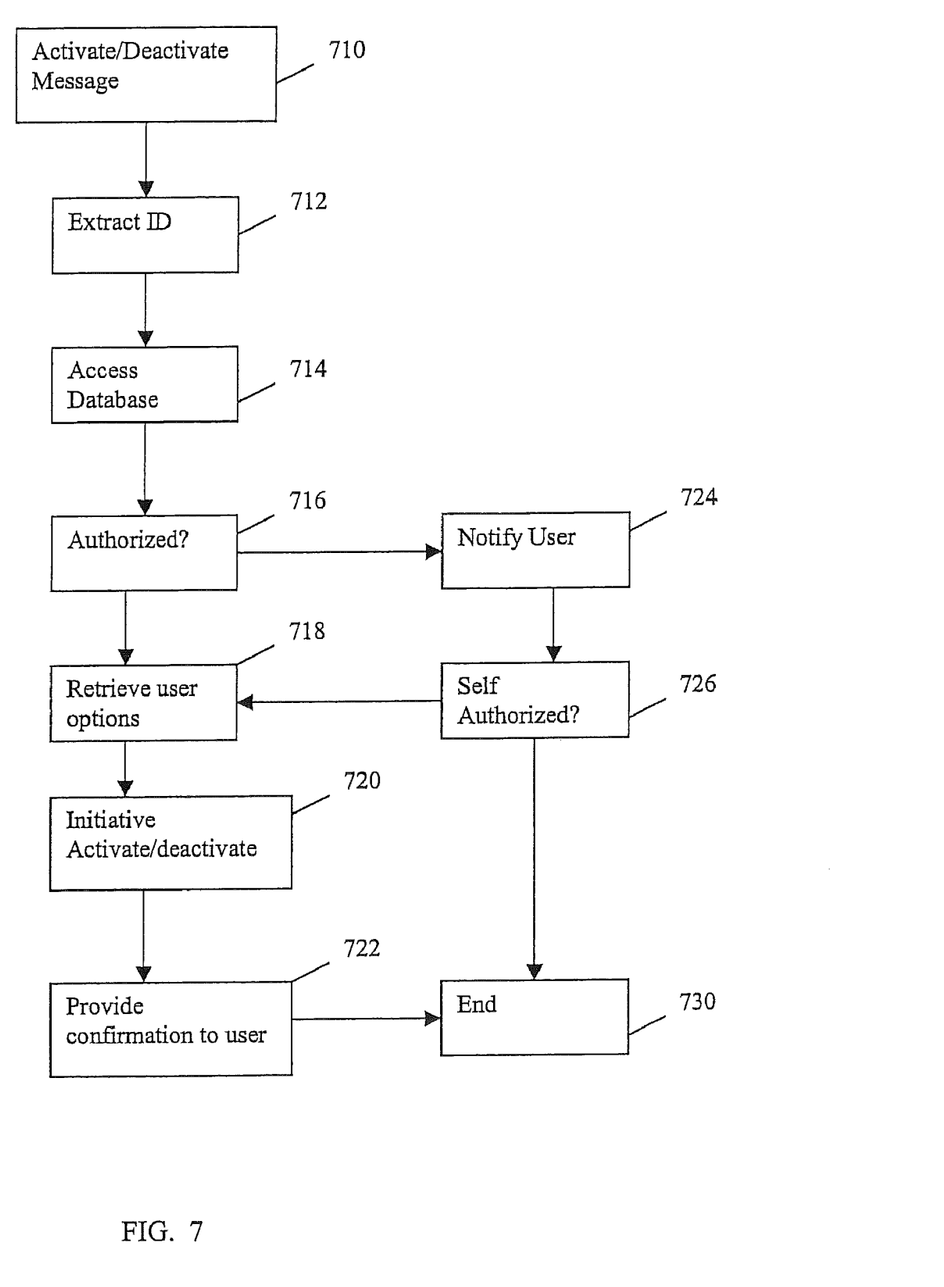
FIG. 7 is flowchart of a process for authorizing activation/deactivation in exemplary embodiments.
Figure 8:
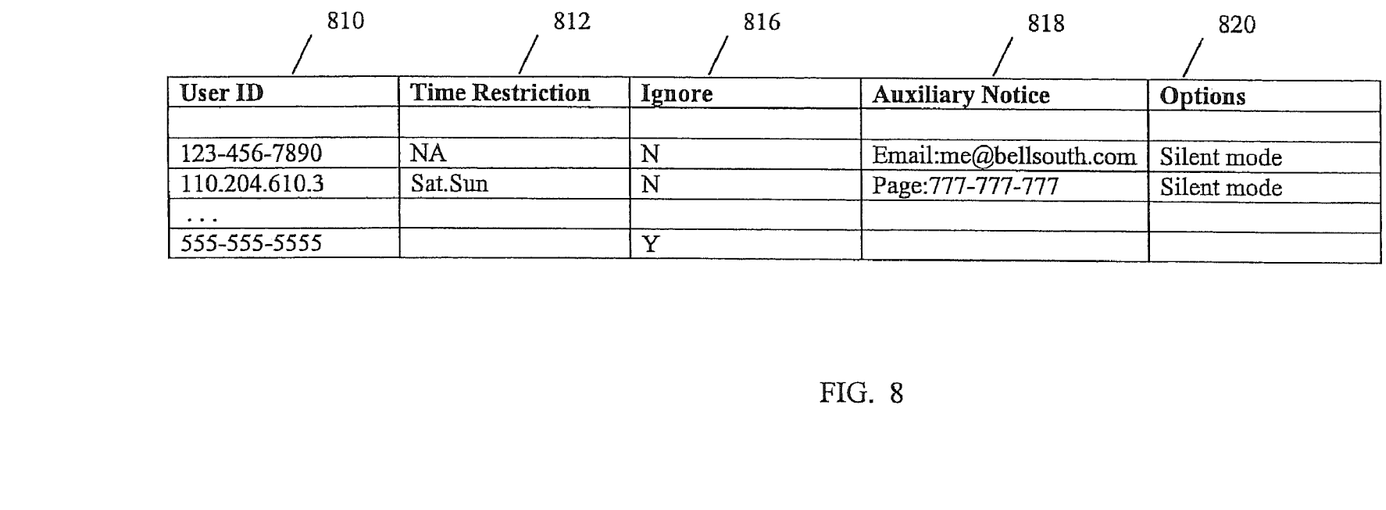
FIG. 8 illustrates authorization database records in exemplary embodiments.

A description of exemplary embodiments of the authorization process is provided with reference to FIGS. 7 and 8. FIG. 7 is a flowchart of a process for initiating the activation/deactivation of the wireless unit 30 in exemplary embodiments. The process may be implemented by the network element 23. Network element 23 may include a processor executing a computer program stored on a storage medium accessible by the processor to implement the functions described herein.

The activation/deactivation process begins at step 710 when the activation/deactivation request is received at the network element 23. Network element 23 extracts a user identification from the request as shown at step 712. The user identification may be based on the phone number from which the activation/deactivation request originated, or user identification field in a packet-based message, etc.

Once the user identification is extracted, the network element 23 accesses the authorization database 24 at step 714 to determine if the user is authorized to activate/deactivate the wireless unit 30. FIG. 8 depicts contents of the authorization database in exemplary embodiments. The database contains records having a number of fields. An identification field 810 includes various user identification entries. These may be phone numbers, IP addresses, etc. A time restriction field 812 includes entries indicating whether there are any time restrictions on the user activating/deactivating the wireless unit. Such restrictions may include only allowing remote activation/deactivation on certain days and/or certain times. Also, a time restriction may include a date upon which activation/deactivation authorization expires.

An ignore field 816 includes an entry indicating whether a user should be completely ignored, including preventing self-authentication. An auxiliary notice field 818 includes entries indicating whether one or more alternate notifications should be sent to the user of the wireless unit when activation/deactivation is requested. For example, the user of the wireless unit 30 may want to receive an email or a page when remote activation/deactivation is requested. The auxiliary notification may also include an identification of the user attempting the activation/deactivation. The identification may be based on the requester's telephone number, IP address, a packet in a message, etc.

An options field 820 includes entries allowing the user of the wireless unit 30 to set options for remote activation/deactivation. For example, the user may specify that all remote activations are to be implemented such that the wireless unit enters silent mode (e.g., vibrate, flash light). This prevents the wireless unit from being audible in certain situations.

Returning to FIG. 7, at step 716 the network element 23 determines if the user is authorized to activate/deactivate the wireless unit 30. This determination is based on the records in the authorization database 24. If the user identification is not found in the database, the user is not considered authorized and a self-authorization process may be initiated as described below. If the user is found in the database, and is not designated positively in the ignore field 816, then flow proceeds to step 718 where the wireless unit user's options are accessed. These include options in the auxiliary notice field 818 and the options field 820.

Once the user has been authorized and the options retrieved, the activation/deactivation operation is initiated at step 720. This activation/deactivation process is performed as described above through wireless system 22, either alone or conjunction with activation system 21. Additionally, any specified auxiliary notices are initiated. The network element 23 sends commands to existing messaging systems such as e-mail servers or a paging system to initiate the auxiliary notice that a user is requesting activation/deactivation of the wireless unit. This command may include information from the auxiliary notice field 818 and the user identification field. For example, a command may be sent to an e-mail server to email me@bellsouth.com that a user associated with phone number 123-456-7890 is attempting to activate the wireless unit. These auxiliary notification systems operate in conventional manners and transmit the auxiliary notice to the user of the wireless unit using known techniques.

At step 722, the network element 23 provides a confirmation to the user requesting activation/deactivation. The wireless system 22 queries the wireless unit 30 for status and determines whether the wireless unit 30 is turned-on or turned-off. The confirmation indicates that the wireless unit 30 was either activated/deactivated in conformance with the user request.

If at step 716, the user is not authorized, flow proceeds to step 724 where a notification is provided to the user that they are not authorized to initiate the activation/deactivation of the wireless unit 30. The notification may be provided in various manners depending on the device used to send the request. For example, if the request originated from a phone, an audible message may be played back to the user. If the request originated from an Internet messaging device, the notification may be in the form of an HTML message.

If the user has not been designated as ignored in ignore field 816, the user is provided the option to self-authorize at step 726. The self authorization routine requests the user to provide certain information in order to be able to initiate activation/deactivation. For example, the user of the wireless unit 30 may specify that a code be submitted to self-authorize or that certain questions be answered correctly to self-authorize. Again, the self-authorization may vary depending on the device used by the user. For a phone, DTMF tones or IVR system may be used for self-authorization. For a messaging device, text or HTML exchanges may be used in the self-authorization process.

If the user successfully completes self-authorization, flow proceeds to step 718 where the activation/deactivation process continues as described above. Alternatively, the process ends as shown at step 730.

The request to initiate authorization has been described with respect to a human user operating a phone or messaging device. Exemplary embodiments also include a non-human request to activate/deactivate the wireless unit 30. For example, the user of the wireless unit 30 may request activation from a weather warning system. The weather warning identifier (e.g., IP address) would be stored in the authorization database 24. Thus, the reference to a user requesting activation/deactivation includes human and non-human requestors of activation/deactivation.

As shown in FIGS. 2A and 2B, a database interface 25 allows the user of wireless unit 30 to modify the contents of the authorization database 24. The database interface 25 may be provided through a web interface allowing the user of the wireless unit to securely log in and modify information as desired.

As described above, embodiments may be in the form of computer-implemented processes and apparatuses for practicing those processes. Exemplary embodiments are embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

We claim:

1. A method to remotely control a wireless unit, comprising:
   receiving an activation request from a user;
   determining if the user is authorized to activate the wireless unit;
   if the user is authorized to activate the wireless unit, sending a signal to the wireless unit causing the wireless unit to power-on in response to the signal;
   subsequent to sending the signal, determining if the wireless unit is activated by initiating a communication to the wireless unit; and
   if a response to the communication is received, providing further communication to the user.

2. The method of claim 1 wherein the activation request is generated based on a phone call from the user.

3. The method of claim 1 wherein determining if the user is authorized to activate the wireless unit includes accessing an authorized user database including records associated with users.

4. The method of claim 3 wherein the records include user identification data identifying users by a user identification entry.

5. The method of claim 4 wherein the user identification entry corresponds to a communication address associated with the user.

6. The method of claim 3 wherein the records include time restriction data identifying a time limitation on when the user is permitted to activate the wireless unit, ignore data identifying that a user is not permitted to activate the wireless unit, and options data including an options entry identifying options for activation of the wireless unit.

7. The method of claim 3 further comprising:
sending an auxiliary notice to a user of the wireless unit, the auxiliary notice indicating that activation of the wireless unit has been requested.

8. The method of claim 7 wherein the auxiliary notice indicates an identity of the user requesting activation of the wireless unit.

9. The method of claim 7 wherein the records include auxiliary notice data identifying a format for the auxiliary notice.

10. A method for controlling a wireless unit, the method comprising:
causing the wireless unit to have a power-on state and a sleep state;
causing the wireless unit to go into the sleep state when the wireless unit is turned-off;
causing the wireless unit in the sleep state to have an active transmit and receive function and an active location function;
causing the wireless unit in the sleep state to change to the power-on state in response to receipt of an authorized remote power-on signal generated by an activation center in response to receipt of an activation request sent by an authorized user; and
providing confirmation that the wireless unit is in the power-on state through a communication with the wireless unit.

11. The method of claim 10 further comprising:
causing the wireless unit to include a remote power-on function;
causing the remote power-on function to be able to detect receipt by the wireless unit of an authorized remote power-on signal; and
in response to detecting the remote power-on signal, causing the remote power-on function to power-on the wireless unit.

12. A non-transitory computer readable storage medium including instructions for execution by a processing circuit for facilitating a method for remotely controlling a wireless unit, the method comprising:
receiving an activation request from a user;
determining if the user is authorized to activate the wireless unit;
if the user is authorized to activate the wireless unit, sending a signal to the wireless unit causing the wireless unit to power-on in response to the signal;
subsequent to sending the signal, determining if the wireless unit is activated by initiating a communication to the wireless unit; and
in response to the communication, providing further communication to the user.

13. The computer readable storage medium of claim 12 wherein the activation request is a data message.

14. The computer readable storage medium of claim 12 wherein the activation request is generated based on a phone call from the user.

15. The computer readable storage medium of claim 14 wherein the records include time restriction data identifying a time limitation on when the user is permitted to activate the wireless unit, ignore data identifying that a user is not permitted to activate the wireless unit, and options data including an options entry identifying options for activation of the wireless unit.

16. The computer readable storage medium of claim 12 wherein determining if the user is authorized to activate the wireless unit includes accessing an authorized user database including records associated with users.

17. The computer readable storage medium of claim 16 wherein the records include user identification data identifying users by a user identification entry.

18. The computer readable storage medium of claim 17 wherein the user identification entry corresponds to a communication address associated with the user.

19. The computer readable storage medium of claim 16 wherein the storage medium readable by a processing circuit further includes instructions for execution by the processing circuit for facilitating a method comprising:
sending an auxiliary notice to a user of the wireless unit, the auxiliary notice indicating that activation of the wireless unit has been requested.

20. The computer readable storage medium of claim 19 wherein the auxiliary notice indicates an identity of the user requesting activation of the wireless unit, wherein the records include auxiliary notice data identifying a format for the auxiliary notice.

* * * * *